United States Patent [19]
Beall et al.

[11] Patent Number: 5,252,523
[45] Date of Patent: Oct. 12, 1993

[54] BIOABSORBABLE CHLOROPHOSPHATE GLASSES AND BIOABSORBABLE GLASS-POLYMER BLENDS MADE THEREFROM

[75] Inventors: George H. Beall, Big Flats; Beth C. Monahan, Painted Post; Candace J. Quinn, Corning, all of N.Y.

[73] Assignee: Corning Incorporated, Corning, N.Y.

[21] Appl. No.: 862,310

[22] Filed: Apr. 2, 1992

Related U.S. Application Data

[63] Continuation-in-part of Ser. No. 773,499, Oct. 9, 1991, abandoned.

[51] Int. Cl.$^5$ .......................... C03C 3/16; C03C 3/23
[52] U.S. Cl. .......................... 501/43; 501/45; 501/47; 501/48
[58] Field of Search .......................... 501/43, 45, 48, 47

[56] References Cited

U.S. PATENT DOCUMENTS

| | | | |
|---|---|---|---|
| 3,732,181 | 5/1973 | Ray et al. | 260/41 B |
| 4,604,097 | 8/1986 | Graves et al. | 623/11 |
| 4,612,923 | 9/1986 | Kronenthal | 128/92 R |
| 4,655,777 | 4/1987 | Dunn et al. | 623/16 |
| 4,678,659 | 7/1987 | Drake et al. | 424/451 |
| 4,920,081 | 4/1990 | Beall et al. | 501/46 X |
| 4,940,677 | 7/1990 | Beall et al. | 501/45 |
| 5,043,369 | 8/1991 | Bahn et al. | 523/466 |
| 5,071,795 | 12/1991 | Beall et al. | 501/45 X |
| 5,122,464 | 6/1992 | Beall et al. | 501/46 |

FOREIGN PATENT DOCUMENTS 2178422 2/1990 United Kingdom.

*Primary Examiner*—Karl Group
*Attorney, Agent, or Firm*—Timothy M. Schaeberle

[57] ABSTRACT

This invention is directed towards the production of a bioabsorbable glass-polymer alloy comprising a bioabsorbable glass and a bioabsorbable polymer, said glass having a working temperature below about 350° C., a transition temperature no higher than about 250° C., and which exhibits a dissolution weight loss rate which is similar to the rate at which a bioabsorbable polymer is absorbed by the body. Such exemplary bioabsorbable polymers include poly(lactic) acid, poly(glycolic) acid, poly(dioxanone), polyethylene terephthalate, polyethylene oxide poly(caprolactone), copolymers of lactic acid and glycolic acid, and mixtures thereof.

The glass disclosed herein consists essentially, expressed in terms of weight percent on the oxide basis, of at least 85% total of 30-55% $P_2O_5$, 12-35% ZnO, 10-30% Cl, and 15-40% $R_2O$, wherein $R_2O$ consists of at least one alkali metal oxide in the indicated proportions selected from the group consisting 5-25% $Na_2O$, 0-25% $K_2O$, and 0-7% $Li_2O$, and up to 15% total optional ingredients in the indicated proportions selected from the group consisting of 0-10% CaO, 0-10% MgO, 0-10% MnO, 0-10% $B_2O_3$, 0-5% $Al_2O_3$, 0-10% $Fe_2O_3$ and 0-5% F.

4 Claims, 3 Drawing Sheets

BIOABSORBABLE CHLOROPHOSPHATE GLASSES AND BIOABSORBABLE GLASS-POLYMER BLENDS MADE THEREFROM

This is a continuation-in-part of Ser. No. 773,499 filed Oct. 9, 1991 now abandoned.

BACKGROUND OF THE INVENTION

This invention relates to glass compositions, and in particular to such compositions which are soluble in water or other polar solvents. Furthermore, this invention relates to glass-polymer alloys formed using these particular compositions.

Surgical devices such as clips and staples made from various metals, such as stainless steel and titanium, are becoming more frequently used in the medical profession as substitutes for and/or complements to surgical sutures and ligatures. In some surgical procedures, the staples are used internally and as thus employed are not removed, but are left inside the patient. The human (and animal) body has ways of isolating such foreign objects left inside a patient so not be to be detrimental. However, surgeons would prefer to use absorbable staples that would dissolve at least to some extent after their function during wound healing. Such dissolution would enable the body to more easily isolate the foreign object.

It has been proposed to produce staples from synthetic absorbable polymers. For instance, many patents that relate to synthetic polymers disclose surgical staples as one, of many, proposed uses. However, thus far surgical staples made from synthetic absorbable polymers have had limited applications in the medical profession because the polymers have yet to achieve the requisite combination of properties needed for more substantial use. Specifically, a staple made from an absorbable polymer must have sufficient stiffness to penetrate tissue; it must retain sufficient strength to perform its function during the wound healing process; and it must then eventually be absorbed by the body. It has proven to be especially difficult to achieve this necessary combination of properties; specifically, the bioabsorbable synthetic polymers, by themselves, have only sufficient stiffness to be used in applications other than those requiring miniature staples, clips or fasteners.

Therefore, efforts were directed towards developing materials which could be used to reinforce existing bioabsorbable synthetic polymers, thus resulting in a composite which possesses sufficient stiffness and absorbability. Illustrative is U.S. Pat. No. 4,604,097 (Graves Jr. et al.) which discloses a glass fiber for use in the area of medical implants, and particularly as a reinforcement for bioabsorbable polymeric orthopedic and dental implants. Also illustrative is U.S. Pat. No. 4,612,923 (Kronenthal) which describes a surgical device, a ligating clip being the preferred device, fabricated from a synthetic absorbable polymer containing an absorbable glass filler. One further example is U.S. Pat. No. 4,655,777 (Dunn et al.) which describes a method of producing biodegradable protheses comprising a composite of resorbable fibers reinforcing a biodegradable polymer matrix and the use thereof in medical applications. These filled polymers have as a limitation the number of intricate shapes which can be fabricated therefrom.

SUMMARY OF THE INVENTION

One of the objectives of this invention is to form a glass/polymer alloy material which would have the desired strength and stiffness, along with the ability to be easily formed into intricate shapes.

We are now disclosing the discovery of chlorophosphate glasses having very low glass transition temperatures, i.e., in the range of Tg between 175° C. and 250° C. These glasses are not durable in hot aqueous solutions, including water alone, and will dissolve slowly without discharging species known to be dangerous or toxic to the body. They are, therefore, well suited to the formation of glass-polymer alloy blends which can be used in bioabsorbable medical functions such as temporary surgical clips and implants.

These inventive non-toxic glasses exhibit working temperatures below about 350° C., transition temperatures no higher than about 250° C., and dissolution rates, when the glasses are immersed in an isotonic saline solution at 37° C., of at least 20% weight loss in 14 days. These glasses consist essentially, expressed in terms of weight percent on the oxide basis, of at least 85% total of 30–55% $P_2O_5$, 12–35% ZnO, 10–30% Cl, and 15–40% $R_2O$, wherein $R_2O$ consists of at least one alkali metal oxide in the indicated proportions selected from the group consisting of 5–25% $Na_2O$, 0–25% $K_2O$, and 0–7% $Li_2O$, and up to 15% total of optional ingredients in the indicated proportions selected from the group consisting of 0–10% CaO, 0–10% MgO, 0–10% MnO, 0–10% $B_2O_3$, 0–5% $Al_2O_3$, 0–10% $Fe_2O_3$ and 0–5% F. The manganese oxide and the iron oxide, though reported as MnO and $Fe_2O_3$, respectively, can be present in any of the various other oxide forms. The preferred glasses consist essentially of at least 85% total of 35–45% $P_2O_5$, 20–30% ZnO, 15–23% Cl, and 15–35% $R_2O$, wherein $R_2O$ consists of at least two alkali metal oxides in the indicated proportions consisting of 5–20% $Na_2O$, 5–17% $K_2O$, and 0–7% $Li_2O$, and up to 15% total of optional ingredients in the indicated proportions selected from the group consisting of 0–5% CaO, 0–5% MgO, 0–5% MnO, 0–7.5% $B_2O_3$, and 0–2% F.

The increased chloride addition to the base glass composition, as compared to the prior art, is important in that the glass transition temperature is lowered substantially, thus making it compatible with the low transition temperatures of the available bioabsorbable polymers.

The discovery of these inventive glasses has, in turn, allowed the discovery of bioabsorbable alloys that have the desired strength and stiffness required for use in the medical device field. Yet, these alloys, because of their unique microstructure, can be easily formed into intricate shapes, thus increasing their use within this field. These glass-polymer alloys also possess superior hardness, stiffness, and dimensional stability when compared to material currently used for medical applications, such as the filled polymers described above.

These bioabsorbable glasses can be melt mixed with at least one bioabsorbable organic thermoplastic or thermosetting polymer. This bioabsorbable alloy which is produced exhibits an essentially uniform fine-grained microstructure comprised of polymer and glass elements. In the preferred embodiment the microstructure demonstrated is either: (1) localized phase inversion/reversal; or, (2) an interconnected, co-continuous spinodal-type microstructure; or, (3) fine spherical, ellipsoidal, and/or serpentine particles of glass separated by thin membranes of polymer; or, (4) an interlocking, three-dimensional microstructure comprising islands of glass in polymer, said polymer having the appearance of winding channels; or, (5) an interlocking, three-dimensional microstructure comprising islands of polymer in glass, said glass having the appearance of winding channels; or, (6) a fine emulsion of glass dispersed in polymer; or, (7) a fine emulsion of polymer dispersed in glass.

As is well recognized in the art, organic polymers are permeable to moisture such that the materials present within the polymer matrix become exposed to the moisture permeating into the polymer. Consequently, the dissolution rate of the glass upon exposure to bodily fluids permeating through the bioabsorbable polymer must not be so rapid that the reinforcement provided to the polymer body is lost before the surgical device has completed its function. On the other hand, the dissolution rate must not be so slow that so much residue therefrom remains after the polymer is absorbed that the body cannot readily isolate and eliminate it. Accordingly, we have found that the dissolution rate of the glass will preferably be similar to the rate at which the polymers are absorbed by the body. The result being that reinforcement is maintained and the residue of glass is so small that the body can readily dispose of it.

Experience has indicated that, as a minimum, the dissolution rate should be such that at least 1% by weight of the glass will be dissolved after an exposure to an isotonic solution at 37° C. for 14 days. At the other extreme, a dissolution rate wherein essentially 100% is dissolved after a similar exposure is too rapid. An operable dissolution rate contemplates a loss such that about 20-99% by weight remains after an exposure of fourteen days, with a loss such that 60-99% by weight remains being most preferred.

Exemplary polymers which may be used in the alloy are: poly(lactic acid), poly(glygolic) acid, poly(dioxanones), polyethylene terephthalate, poly(ethylene oxide) and poly(caprolactone). Additional polymers which would be suitable would be copolymers of lactic acid and glycolic acid as well as mixtures of the above reported polymers.

PRIOR ART

The glasses disclosed in the three above-described patents, although phosphate-based and bioabsorbable, are quite different from the glasses disclosed herein. Those glasses, all used as fillers for reinforcing bioabsorbable polymers, do not contain any, nor is there any reference to, chloride additions. The presence of chloride in amounts from 10-25 weight percent is important in the inventive glass composition in order to reduce the transition temperature enough to be "melt mix" compatible with the bioabsorbable polymers. One illustration of the melt mixing method of making the glass-/polymer blends is that disclosed in U.S. Pat. No. 5,043,369 (Bahn et al.)

U.S. Pat. No. 5,071,795 (Beall et al.) discloses an alkali zinc halophosphate glass demonstrating working temperatures below about 450° C., transition temperatures no higher than about 350° C., and good resistance to attack by mild aqueous alkaline solutions consisting essentially, expressed in terms of mole percent on the oxide basis, of about 0-25% $Li_2O$, 25-50% ZnO, 5-20% $Na_2O$, 0-3% $Al_2O_3$, 0-12% $K_2O$, 25-37% $P_2O_5$, 15-35% $Li_2O+Na_2O+K_2O$, and 0-10% SnO to which are included 0.5-8% Cl and 0-5% F. Unlike the inventive glasses disclosed herein, the glasses of that patent display good resistance to attack by mild aqueous alkaline solutions and thus would be unsuitable for the bioabsorbable applications of the present glass. Contrary to the compositions disclosed in the Beall et al. patent, the present higher chloride inventive glasses have reduced resistance to attack by isotonic saline solutions along with a reduced resistance to mild aqueous alkaline solutions. Additionally, in part due to the difference in the chloride amounts, 0.5-8% as compared to 10-25%, the 350° C. transition temperature of the Beall et al. glasses is considerably higher than the 250° C. disclosed herein.

U.S. Pat. No. 5,043,369 (Bahn et al.) describes the preparation of alloy articles consisting essentially of glass and/or glass-ceramic and an organic thermoplastic or thermosetting polymer having a working temperature compatible with that of the glass and/or the precursor glass for the glass-ceramic. The glass and the polymer are intimately mixed to form a body exhibiting an essentially uniform, fine-grained microstructure. Although the instant invention discloses similar microstructures, it can be distinguished from the Bahn et al. reference. One of the main objectives of Bahn et al. was to prepare an alloy which displayed excellent resistance to moisture and mild aqueous alkaline solutions. An alloy displaying excellent resistance to moisture and mild aqueous solutions is counter to the bioabsorbable concept of the instant invention.

DESCRIPTION OF THE PREFERRED EMBODIMENTS

Figure 1:
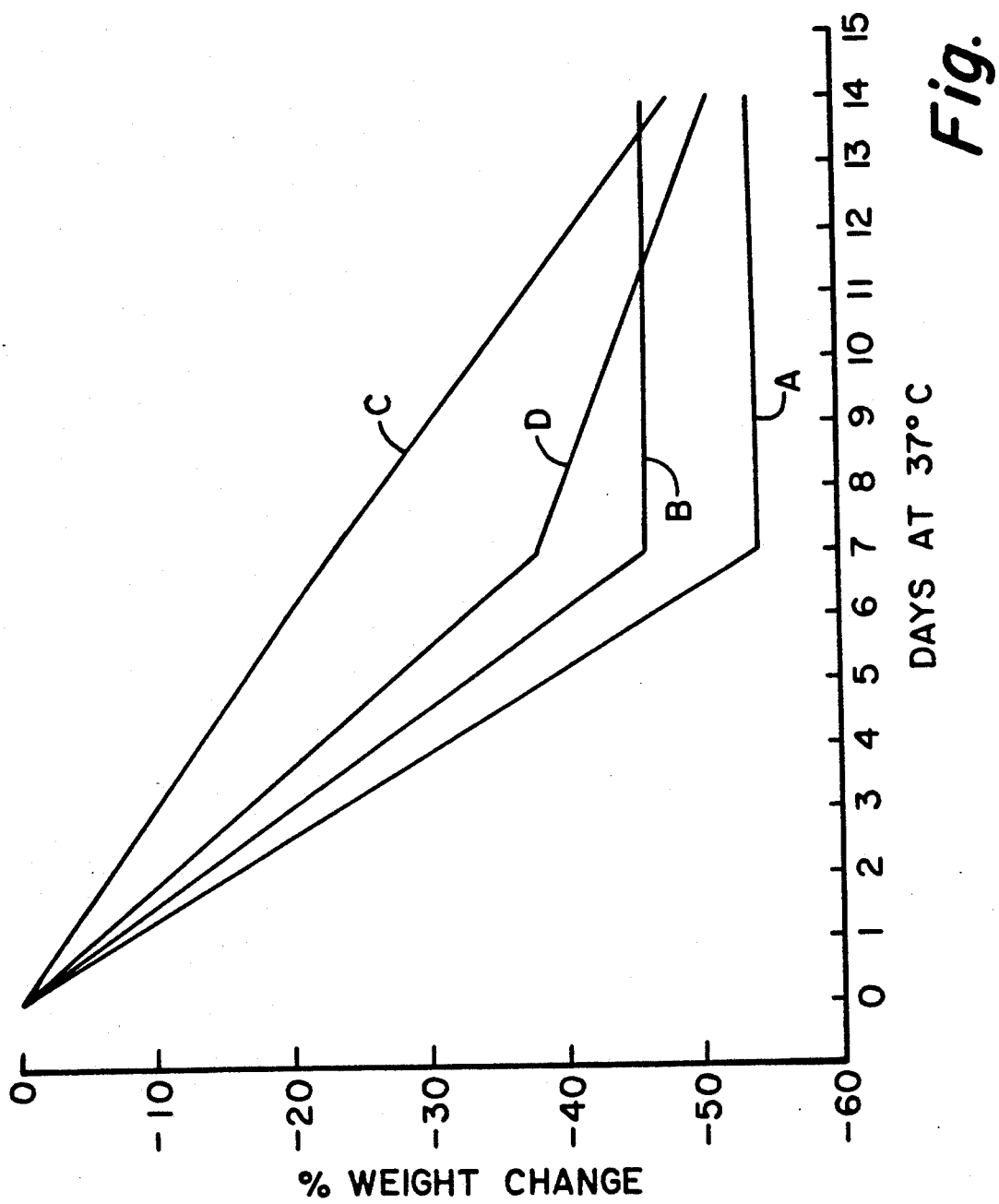
FIG. 1 sets forth the weight loss %-time behavior of the inventive phosphate glasses when placed in an unbuffered saline solution having a pH of 6.2.

Throughout this application the term bioabsorbable, as it relates to either the glass or polymer, is defined as a material which can be degraded and gradually absorbed and/or eliminated by the body, regardless of the method employed by the body, whether through hydrolysis, through the metabolic process, or through other processes.

Table I records a group of glass compositions expressed in terms of weight percent on the oxide basis. Since it is not known with which cation(s) the chloride is combined, it is reported as chloride (Cl), and the oxygen-chloride correction factor reported in accordance with conventional glass analysis practice. Other relevant information recorded in Table I is the $T_g$ of the glass reported in terms of °C., as measured employing standard differential scanning calorimetry techniques, and the working temperature of the glass expressed in terms of °C., as estimated in the below described cane pulling procedure (PULL). These examples are intended to further clarify the invention and are intended to be purely exemplary of the use of the invention.

The actual batch ingredients for the inventive glass can comprise any materials, including the oxides, hydroxides, halides, carbonates or others, which, upon being melted together, will be transformed into the desired oxide in the proper proportions as shown in Table I. Illustrative is the use of sodium phosphate were tested and plotted; (1)Example 4-A; (2)Example 5-B; (3) Example 6-C; and, (4) Example 7-D.

TABLE I

|  | 1 | 2 | 3 | 4 | 5 | 6 | 7 | 8 | 9 | 10 | 11 |
|---|---|---|---|---|---|---|---|---|---|---|---|
| $P_2O_5$ | 41.2 | 43.2 | 39.5 | 41.2 | 43.1 | 42.3 | 41.7 | 41.3 | 42.7 | 40.9 | 38.2 |
| $Na_2O$ | 18.0 | 9.7 | 8.8 | 10.4 | 8.6 | 8.9 | 9.3 | 9.3 | 8.0 | 7.6 | 6.1 |
| $K_2O$ | — | — | 12.7 | 14.9 | 13.0 | 12.8 | 13.4 | 13.3 | 12.1 | 11.5 | 9.7 |
| ZnO | 24.3 | 25.4 | 23.3 | 18.6 | 21.1 | 20.8 | 18.7 | 18.6 | 21.0 | 21.3 | 24.8 |
| Cl | 21.2 | 22.2 | 20.3 | 16.2 | 18.4 | 18.1 | 16.4 | 16.3 | 18.3 | 18.5 | 21.6 |
| MgO | — | — | — | — | — | — | 0.7 | — | 1.0 | 1.0 | — |
| CaO | — | — | — | — | — | — | 1.0 | — | 0.9 | 1.0 | — |
| $B_2O_3$ | — | — | — | 2.5 | — | — | 2.5 | 4.9 | — | 2.4 | 1.9 |
| MnO | — | — | — | — | — | 1.2 | — | — | — | — | — |
| $Li_2O$ | — | 4.4 | — | — | — | — | — | — | — | — | 3.0 |
|  | 104.7 | 104.9 | 104.6 | 103.8 | 104.2 | 104.1 | 103.7 | 103.7 | 104.0 | 104.2 | 105.3 |
| O~Cl | −4.7 | −4.9 | −4.6 | −3.8 | −4.2 | −4.1 | −3.7 | −3.7 | −4.0 | −4.2 | −5.3 |
|  | 100.0 | 100.0 | 100.0 | 100.0 | 100.0 | 100.0 | 100.0 | 100.0 | 100.0 | 100.0 | 100.0 |
| $T_g$ | — | 195 | 195 | 199.9 | 214.3 | 206.5 | 212.3 | 236.8 | 234.8 | — | — |
| PULL | — | 250 | 250 | 275 | 300 | 275 | 325 | 325 | 310 | 325 | 300 | which serves as a source of both the $P_2O_5$ and the $Na_2O$.

The batch materials were thoroughly mixed in an automatic tumbler to aid in achieving a homogeneous melt and then placed in silica crucibles. The crucibles were then covered and the batch materials dried at 300° C. for about 2 hours. After drying, the crucibles were placed in a electrically-fired furnace operating at about 750° C. for about 2 hours. The molten glass was then formed into either slabs of about $4'' \times 8'' \times 0.5''$ or rolled into sheet form. The slabs or sheets were then placed into an annealer, operating at 200° C., where they remained overnight. The rolled sheet was ground into coarse powder (12 mesh sieve size: approximately 1.68 mm) with alumina plates.

Rectangular tab-shaped pieces weighing about 30-40 grams were cut from the annealed slabs and heated in cups shaped from aluminum foil at temperatures within the range of about 300°-400° C. Glass cane was hand-drawn from each cup to gain a close approximation of the working temperature of the glass.

Whereas the above description reflects laboratory melting and forming only, it will be appreciated that the inventive glasses are capable of being melted in large scale melting units and shaped into articles of desired geometries utilizing techniques conventional in the glass making art. Hence, in accordance with standard practice, it is only necessary that the batch materials be thoroughly mixed together, the batch then melted at temperatures assuring a homogeneous melt, that melt subsequently cooled and simultaneously shaped into a glass article of desired configuration, and that shape will customarily be annealed.

The resultant coarsely ground powder was then subjected to a static dissolution tests using the following three 37° C. solutions: (1) a 0.1M phosphate buffered solution with a pH of 7.4; (2) 0.01M phosphate buffered solution with a pH of 7.4; and (3) unbuffered saline solution with a pH of 6.2. In each case the glasses were weighed and then submerged in the solution, 20:1 saline solution volume to glass weight ratio (100:1 for the buffered solutions), and left there for seven days at which point the glass was removed, filtered and rinsed with distilled water. Following overnight drying in a vacuum oven at 80° C., the glasses were then reweighed before being placed back into the original solution. This procedure was continued until the glass reached an equilibrium weight loss state.

Figure 2:
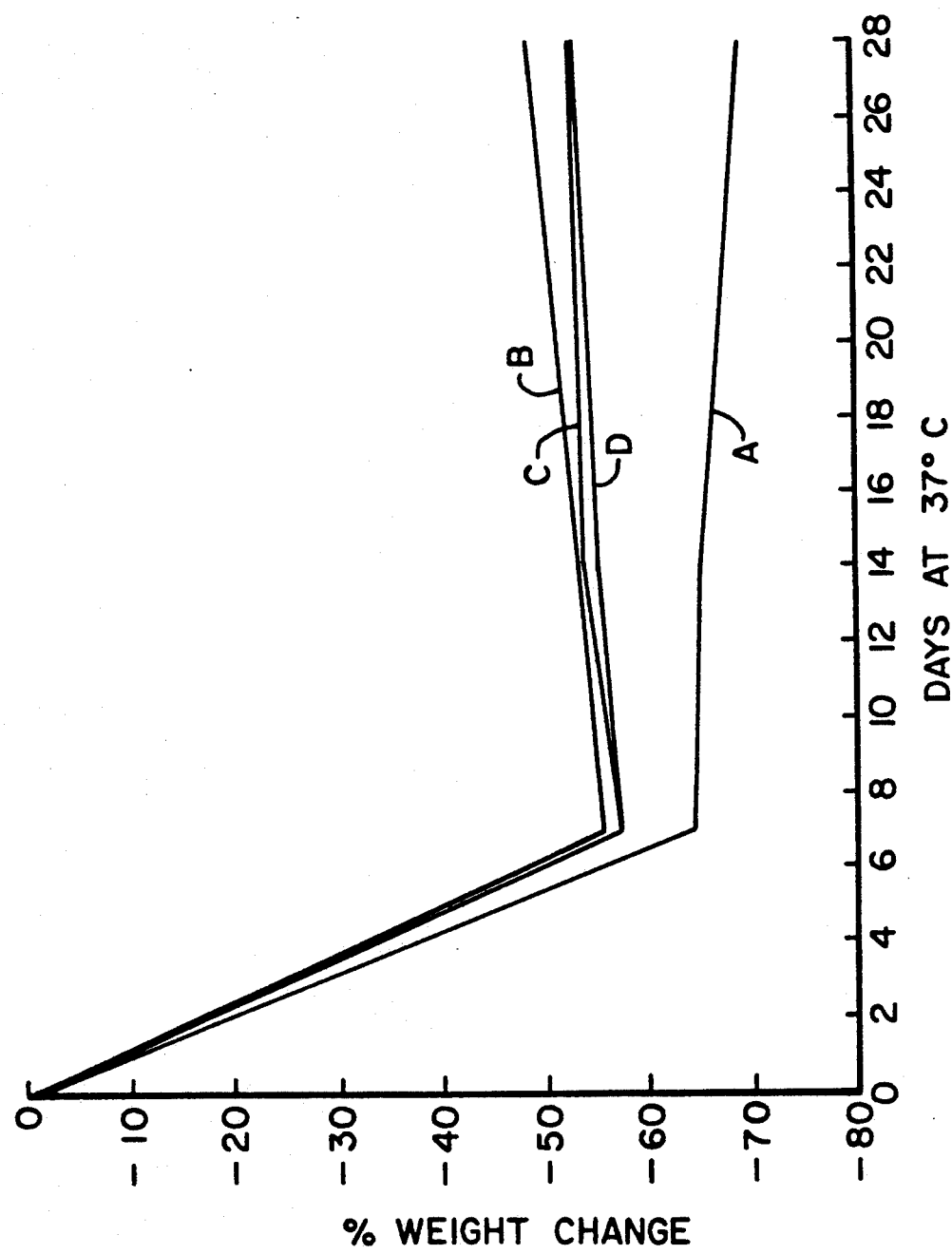
FIG. 2 sets forth the weight loss %-time behavior of the inventive phosphate glasses when placed in a 0.01M phosphate buffered solution having a pH of 7.4.
Figure 3:
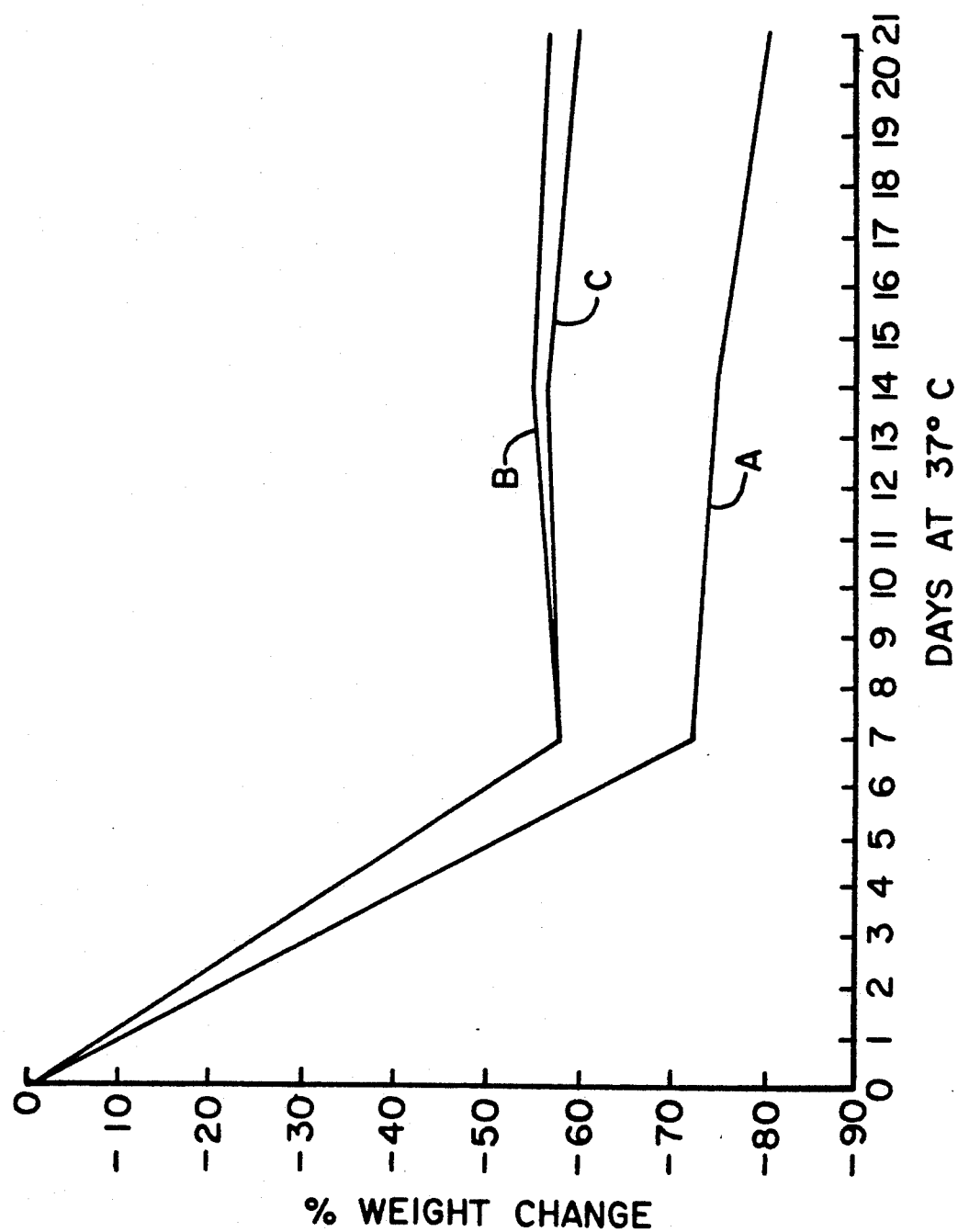
FIG. 3 sets forth the weight loss %-time behavior of the inventive phosphate glasses when placed in a 0.1M phosphate buffered solution having a pH of 7.4.

The dissolution behavior of a number of the glass compositions in each of the three above described solutions is found in FIGS. 1-3. The following four samples It is contemplated that other glass additives, though not mentioned, may be included in this inventive phosphate glass composition so long as they do not affect the glass's dissolution rate, such that it is no longer similar to the dissolution rate of bioabsorbable polymer, and so long as the glass remains "melt mix process" compatible with the bioabsorbable polymers.

Another important consideration of the glass additive is that it be non-toxic. Since a glass which is not harmful to the human body is defined as non-toxic, it follows that a non-toxic additive can be defined as any additive that is added in an amount which is not harmful to the body.

As was earlier discussed, Bahn et al. disclosed the preparation of durable alloy articles consisting essentially of a glass and an organic thermoplastic or thermosetting polymer with compatible working temperatures. This technology, coupled with the inventive glasses disclosed herein, has allowed it to be technically possible to make bioabsorbable glass-polymer alloys.

The earlier described Bahn et al. patent discusses the intimate mixing of the glass and polymer at the working temperature to form a body exhibiting an essentially uniform microstructure wherein the glass and polymer elements are in an essentially non-oriented relationship and are present as particles of less than 50 microns in the largest dimension. Furthermore, it provides discussion on the various forms of the preferred and uniform microstructures. The fact that intimate mixing is an integral part of the instant invention, coupled with the similarities in the disclosed microstructures between the inventions, makes it necessary to incorporate by reference Bahn et al. into the present application.

There are, however, certain modifications to the processing disclosed in Bahn et al. which must be implemented in order to produce the bioabsorbable alloys. Modifications to the drying process as well as the extruder will be necessary in order to compensate for the hygroscopic nature of the glass and polymers. Specifically, the polymer and glass will be dried under vacuum, and then transferred and stored in a hopper purged with an inert gas until ready for extrusion. As to the twin screw extruder utilized in Bahn et al., it will be necessary to add an injection port in order to blow an inert gas over the polymer and glass pellets just before they enter the melting zone. This will result in a further drying of the materials. One final modification to the process involves the use of special equipment utilized to keep the final extruded alloy dry until it can be pelletized and sealed in gas purged cans.

we claim:

1. A bioabsorbable glass exhibiting a working temperature below about 350° C., a transition temperature no higher than about 250° C., and which exhibits a dissolution weight loss rate such that, when the glass is exposed to an isotonic solution at 37° C. for 14 days, the percentage weight remaining of the glass ranges from 20% to 99%, wherein the glass consists essentially, expressed in terms of weight percent on the oxide basis, of at least 85% total of 30–55% $P_2O_5$, 12–35% ZnO, 10–30% Cl, and 15–40% $R_2O$, wherein $R_2O$ consists of at least one alkali metal oxide in the indicated proportion selected from the group consisting 5–25% $Na_2O$, 0–25% $K_2O$, and 0–7% $Li_2O$, and up to 15% total of optional ingredients in the indicated proportions selected from the group consisting of 0–10% CaO, 0–10% MgO, 0–10% MnO, 0–10% $B_2O_3$, 0–5% $Al_2O_3$, 0–10% $Fe_2O_3$ and 0–5% F.

2. A glass according to claim 1 consisting essentially, expressed in terms of weight percent on the oxide basis, of at least 85% total of 35–45% $P_2O_5$, 20–30% ZnO, 15–23% Cl, and 15–35% $R_2O$, wherein $R_2O$ consists of at least two alkali metal oxides in the indicated proportions selected from the group consisting 5–20% $Na_2O$, 5–17% $K_2O$, and 0–7% $Li_2O$, and up to 15% total optional ingredients in the indicated proportions selected from the group consisting of 0–5% CaO, 0–5% MgO, 0–5% MnO, 0–7.5% $B_2O_3$, and 0–2% F.

3. A glass according to claim 2 which exhibits a dissolution rate such that, when the glass is exposed to an isotonic solution at 37° C. for 14 days, the percentage weight remaining of the glass ranges from 60% to 99%.

4. A glass according to claim 1 which exhibits non-toxic behavior.

* * * * *